US010309867B2

(12) United States Patent
Hovik et al.

(10) Patent No.: US 10,309,867 B2
(45) Date of Patent: Jun. 4, 2019

(54) VARIABLE SPRING-CONSTANT TUNED MASS DAMPER

(71) Applicant: The Boeing Company, Chicago, IL (US)

(72) Inventors: Stefan Hovik, Issaquah, WA (US); Mathew Lee Rueger, Edwardsville, IL (US); Ian Miles Gunter, Burien, WA (US); Bryan D. McGranahan, O'Fallon, MO (US)

(73) Assignee: The Boeing Company, Chicago, IL (US)

(*) Notice: Subject to any disclaimer, the term of this patent is extended or adjusted under 35 U.S.C. 154(b) by 216 days.

(21) Appl. No.: 15/237,375

(22) Filed: Aug. 15, 2016

(65) Prior Publication Data

US 2018/0045600 A1 Feb. 15, 2018

(51) Int. Cl.
*G01M 9/04* (2006.01)
*F16F 7/10* (2006.01)

(52) U.S. Cl.
CPC .......... *G01M 9/04* (2013.01); *F16F 7/10* (2013.01); *F16F 7/1017* (2013.01)

(58) Field of Classification Search
CPC .. G01M 9/04; F16F 7/10; F16F 7/1017; F16F 7/112; F16F 7/116
See application file for complete search history.

(56) References Cited

U.S. PATENT DOCUMENTS 2,819,775 A 1/1958 Everett
2,854,100 A 9/1958 Bowser et al.
(Continued)

FOREIGN PATENT DOCUMENTS

DE 1039851 B 9/1958
DE 3316177 A1 11/1984
(Continued)

OTHER PUBLICATIONS

Taft et al., "Determination of the Temperature Dependent Spring Constant of a Nitinol Expansion Spring", Nov. 29, 2006, accessed online <https://www.imagesco.com/science/Nitinol-Spring%20Data.pdf> in May 2018.*

(Continued)

*Primary Examiner* — David Z Huang
(74) *Attorney, Agent, or Firm* — Kolisch Hartwell, P.C.

(57) ABSTRACT

A tunable mass-damping apparatus may include a housing having an interior surface, an interior volume containing a fluid, and an axis. The housing may be configured to be coupled to a wind tunnel model. The apparatus may further include a mass configured to move back and forth in the interior volume along the axis. The mass may be configured to make an airtight seal with the interior surface of the housing, thereby dividing the interior volume into an upper chamber and a lower chamber. The apparatus may include a passage fluidly connecting the upper chamber and the lower chamber and a spring configured to exert a position-dependent force upon the mass. The spring may be characterized by a variable spring constant chosen based on a variable natural frequency of a support structure of the wind tunnel model. The variable spring constant may be established with a nickel-titanium alloy spring heated to at least one calibrated temperature that corresponds to a predetermined spring constant.

18 Claims, 7 Drawing Sheets

(56) References Cited

U.S. PATENT DOCUMENTS

| | | | |
|---|---|---|---|
| 3,173,514 | A | 3/1965 | Tiedemann |
| 3,572,112 | A | 3/1971 | Igoe |
| 3,934,535 | A | 1/1976 | Culver |
| 4,600,686 | A | 7/1986 | Meyer et al. |
| 4,660,689 | A | 4/1987 | Hayashi et al. |
| 5,558,191 | A | 9/1996 | Lai |
| 5,644,075 | A | 7/1997 | Hefer |
| 5,816,373 | A | 10/1998 | Osterberg et al. |
| 7,127,942 | B2 | 10/2006 | Gibson |
| 7,681,701 | B2 | 3/2010 | Mikonaho |
| 2016/0058268 | A1* | 3/2016 | Salman ............ A61B 1/0055 600/149 |
| 2016/0069409 | A1 | 3/2016 | McGranahan et al. |
| 2017/0241862 | A1* | 8/2017 | McGranahan ......... G01M 9/04 |

FOREIGN PATENT DOCUMENTS

| | | | |
|---|---|---|---|
| GB | 468365 | A | 12/1935 |
| GB | 539720 | A | 9/1941 |
| GB | 771663 | A | 4/1957 |
| WO | 9842998 | A2 | 10/1998 |
| WO | 9842998 | A3 | 10/1998 |

OTHER PUBLICATIONS

Maurer Söhne, "Maurer Tuned Mass and Viscous Dampers" dated Jul. 29, 2011, retrieved from the Internet on Jul. 7, 2014 from http://www.maurersoehne.com/files/bauwerkschutzsysteme/pdf/en/brochure/MAURER_Tuned_Mass_and_Viscous_Dampers.pdf, 32 pages.

U.S. Patent and Trademark Office, Office action in U.S. Appl. No. 15/048,876, dated Nov. 20, 2017, 25 pages.

Superflow Technologies Group, Airflow Basics Service Procedure, URL: http://www.superflow.com/support/supportDocuments/airflow_basics.pdf, 2000, 6 pages.

Ogilvy, Fergus, "How Renault F1 Won a World Championship by Creating the Tuned Mass Damper", URL: http://mooregoodink.com/how-renault-f1-found-faster-lap-times-and-won-a-world-championship-by-creating-the-tuned-mass-damper/, Nov. 4, 2013, 3 pages.

NASA Technical Memorandum, "Reduction of Wind-Tunnel-Model Vibration by Means of a Tuned Damped Vibration Absorber Installed in the Model", NASA TM X-1606, Jan. 1, 2015, 31 pages.

Theory of Machines, TM-164 Free Vibrations of a Mass-spring System, URL: http://www.tecquipment.com/Datasheets/TM164_1015.pdf, circa before Dec. 3, 2015, 3 pages.

Wikipedia, "Damping", URL: https://en.wikipedia.org/wiki/Damping, circa before Jan. 5, 2016, 8 pages.

United States Patent and Trademark Office, Office action in U.S. Appl. No. 14/477,701, dated Sep. 17, 2015, 13 pages.

European Patent Office, Extended European Search Report in European Patent Application No. 15179083.9-1557, dated Feb. 8, 2016, 9 pages.

United States Patent and Trademark Office, Office action in U.S. Appl. No. 14/477,701, dated Feb. 17, 2016, 12 pages.

* cited by examiner

VARIABLE SPRING-CONSTANT TUNED MASS DAMPER

FIELD

This disclosure generally relates to wind tunnel testing of model aircraft. More specifically, the disclosed embodiments relate to apparatus and methods for reducing undesirable vibrations of the model at various natural frequencies of the testing system.

INTRODUCTION

Aerodynamic testing of models in wind tunnels is a common and important part of the aeronautics industry. Accurate testing is necessary for safety, and can potentially save millions of dollars by eliminating real-world test flights. An inherent complication of wind tunnel testing is the introduction of experimental artifacts that would not be present in a real-world setting. Such artifacts include the forces exerted on a model during testing that arise from the support structure that is holding the model in place. These forces would obviously not be present on a real-world aircraft, and can interfere with any efforts to measure the forces on the model that arise from the aerodynamic performance of the model itself.

One solution to the problem of undesirable artifact forces is to reduce the dynamic pressure of the wind tunnel and hence the wind speed. This solution has the disadvantage of increasing the chance of scale effects in the wind tunnel data. A second solution is to build extra stiffness into the support structure, thus decreasing vibrations of the support structure and the associated forces on the model from the support structure. This is usually done by increasing the balance capacity and the size of the support. However, increasing the balance capacity would tend to decrease the sensitivity of the tests, and increasing the size of the support would take the model farther away from the reality it is trying to replicate, both undesirable effects. A third solution is to avoid test conditions that would give rise to unsteady aerodynamic phenomena, such as wing drop or buffet, which can excite the natural vibrational modes of the support structure. This is the worst of the three solutions, because the results of tests under such conditions are often of great interest to the end users of the wind tunnel data.

A mass-damping apparatus, or mass damper, can effectively increase the damping of a wind tunnel support system without a need for reducing wind tunnel dynamic pressure, increasing stiffness of the support, or avoiding conditions that would give rise to unsteady aerodynamic phenomena. Generally speaking, a mass damper is a damped oscillator that can be coupled to a wind tunnel model. The natural frequency of the oscillator can be chosen to coincide with a natural frequency of an undesirable artifact vibration of the wind tunnel support, which allows coupling of the motion of the damper mass with that of the wind tunnel support. This coupling enables the mass damper to influence the wind tunnel support system by replacing a single oscillatory mode with low damping with a coupled wind tunnel support/mass damper oscillation with higher damping.

The natural vibration frequencies of the support structure for the wind tunnel model may not be constant in time, and may depend on factors such as the wind speed in the tunnel, the dynamic pressure in the tunnel, and the temperature within the tunnel. Thus, the natural vibration frequencies of the support structure may change, either during a single test or in between tests when testing parameters are changed.

Mass dampers may be "tuned" in order to absorb vibrations of a particular frequency, or range of frequencies, by choosing components of the device accordingly. In order to re-tune the mass damper to a new frequency, existing mass dampers must be partially or completely disassembled and subsequently reassembled with new components. This retuning process can be costly and time-consuming, as mass dampers are typically installed within the model aircraft for aerodynamic purposes. Such retuning by reassembly obviously cannot be completed during an actual wind tunnel test.

In some existing mass dampers, the components of the damper are chosen so that the device can absorb vibrations over a broad range of frequencies. Such broadband mass dampers could continue to function even as the vibration frequencies shift or change. Broadband mass dampers typically include a relatively large oscillating mass. Large oscillating masses require a correspondingly large mass damping apparatus which may be difficult to fit in the limited available space within a model aircraft.

Existing mass dampers may also rely on off-the-shelf springs, which often have only a discrete set of available spring constants. The frequency to which the mass damper is tuned may depend on the spring constants of the chosen springs. Thus, existing mass dampers may be limited in the number of frequencies to which they can be tuned by the limits of available springs.

SUMMARY

In some embodiments, a tunable mass-damping apparatus may include a housing having an interior surface, an interior volume containing a fluid, and an axis. The housing may be configured to be coupled to a wind tunnel model. The apparatus may further include a mass configured to move back and forth in the interior volume along the axis. The mass may be configured to make an airtight seal with the interior surface of the housing, thereby dividing the interior volume into an upper chamber and a lower chamber. The apparatus may include a passage fluidly connecting the upper chamber and the lower chamber and a spring configured to exert a position-dependent force upon the mass. The spring may be characterized by a variable spring constant chosen based on a variable natural frequency of a support structure of the wind tunnel model. The variable spring constant may be established with a nickel-titanium alloy spring heated to at least one calibrated temperature that corresponds to a predetermined spring constant.

In some embodiments, a tunable mass-damping apparatus may include a housing having an interior surface, an interior volume containing a fluid, and an axis. The housing may be configured to be coupled to a wind tunnel model. The apparatus may include a mass configured to move back and forth in the interior volume along the axis. The mass may be configured to make an airtight seal with the interior surface of the housing, thereby dividing the interior volume into an upper chamber and a lower chamber. The apparatus may include a passage fluidly connecting the upper chamber and the lower chamber and a spring configured to exert a position-dependent force upon the mass, the spring having a temperature-dependent spring constant. The apparatus may include a temperature control assembly configured to raise the temperature of the spring and thereby alter the spring constant of the spring. The spring may be chosen based on a natural vibration frequency of a support structure of the wind tunnel model.

In some embodiments, a method of reducing dynamic forces on a wind tunnel model during wind tunnel testing may include selecting a mass with weight equal to a predetermined percentage of weight of the wind tunnel model. The method may include selecting a spring with a temperature-dependent, variable spring constant chosen based on a natural frequency of a support structure for the wind tunnel model. The method may include attaching to the wind tunnel model a mass-damping apparatus that includes a housing having an interior surface, an interior volume containing a fluid, and an axis, the housing configured to be coupled to the wind tunnel model. The apparatus may include the selected mass configured to move back and forth in the interior volume along the axis. The mass may be configured to make an airtight seal with the interior surface of the housing, thereby dividing the interior volume into an upper chamber and a lower chamber. The apparatus may include the selected spring configured to exert a position dependent force upon the mass and a temperature control assembly configured to raise the temperature of the spring. The method may include exerting control over the spring constant of the spring via the temperature control assembly and performing wind tunnel testing on the model.

Features, functions, and advantages may be achieved independently in various embodiments of the present disclosure, or may be combined in yet other embodiments, further details of which can be seen with reference to the following description and drawings.

DETAILED DESCRIPTION

Overview

Various embodiments of a mass-damping apparatus having a temperature-dependent, variable spring constant are described below and illustrated in the associated drawings. Unless otherwise specified, the mass-damping apparatus and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar tunable mass dampers. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Examples, Components, and Alternatives

The following sections describe selected aspects of exemplary mass dampers as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

Figure 1:
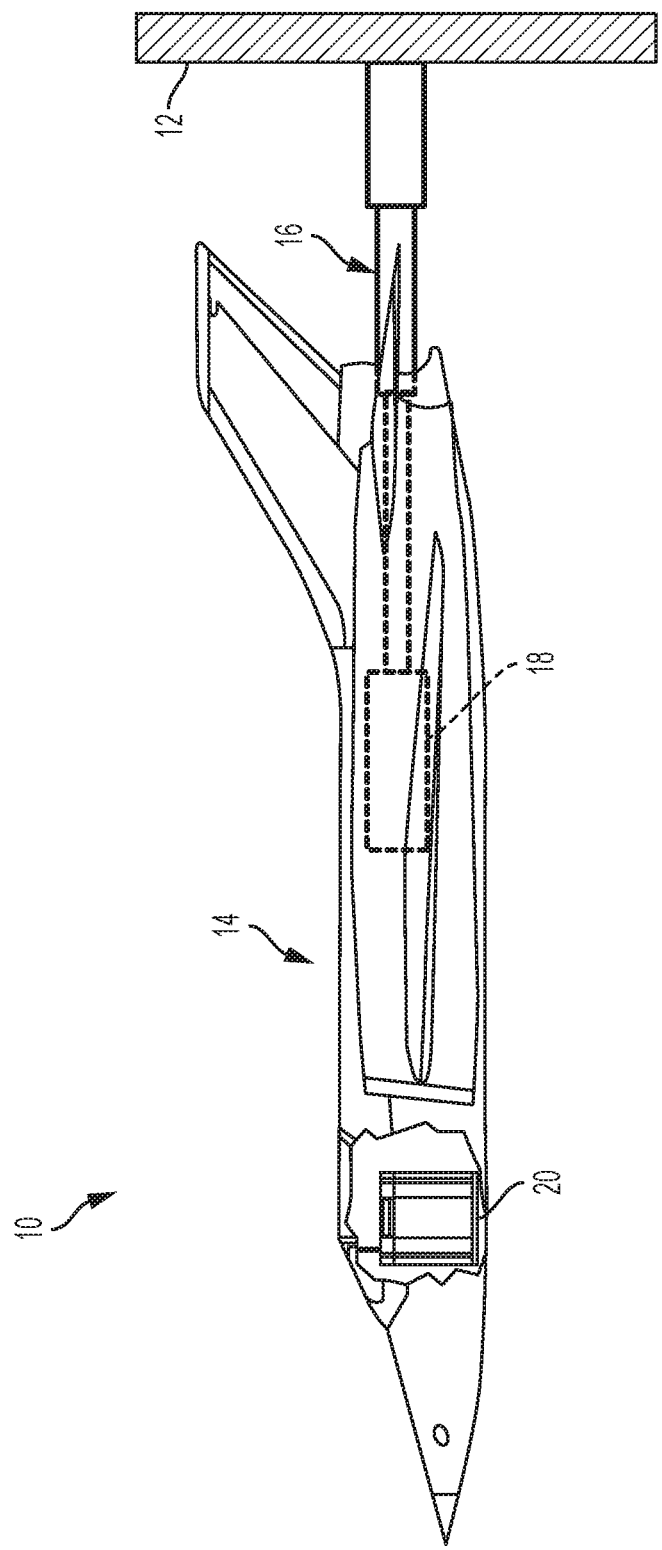
FIG. 1 is a semi-transparent side elevational view of a wind tunnel testing system depicting a mass-damping apparatus disposed within an airplane model.

This example describes an illustrative wind tunnel testing system, see FIG. 1.

FIG. 1 is a semi-transparent side elevational view of an exemplary wind tunnel testing system, generally indicated at 10. Wind tunnel testing system 10 may include a wind tunnel chamber, a portion of which is indicated at 12, a model 14, a support structure 16 for the model, an internal balance 18, and a tunable mass-damping apparatus 20. The mass-damping apparatus 20 may be used to decrease vibrations of model 14 and/or the support structure 16 that supports the model during wind tunnel testing of the model. Mass-damping apparatus 20 may be coupled to the model, for example, with screws, bolts, adhesives, press fitting, or by any other suitable means.

Model 14 may be connected to the internal balance 18, which may be the primary measurement device used in wind tunnel testing to determine the motions of the model as a function of time. The internal balance may be connected to support structure 16 which supports the model during testing. In some cases, the natural vibrational frequencies of model 14 and/or support structure 16 may be known exactly or nearly exactly, and mass-damping apparatus 20 may be pre-configured or tuned to dampen at least some of the associated vibrations. In other cases, the natural frequencies of the system may be unknown or known only approximately, in which case it may be desirable to adjust or "tune" the mass damper during aerodynamic testing, until it damps vibrations at one or more desired frequencies. This can be accomplished by adjusting various parameters of the mass damper, as described in more detail below.

In any event, when mass damper 20 is adjusted to reduce or prevent vibrations of model 14 that arise from the coupling of the model with support structure 16, this allows internal balance 18 to measure only (or primarily) vibrations associated with the actual aerodynamic performance of the model, thus improving the accuracy and utility of the wind tunnel testing. In some embodiments, mass damper 20 may be tuned to a relatively narrow band of frequencies centered on a natural vibrational frequency of the support structure, thereby leaving vibrations which arise from the aerodynamic performance of the model undamped.

Example 2

Figure 2:
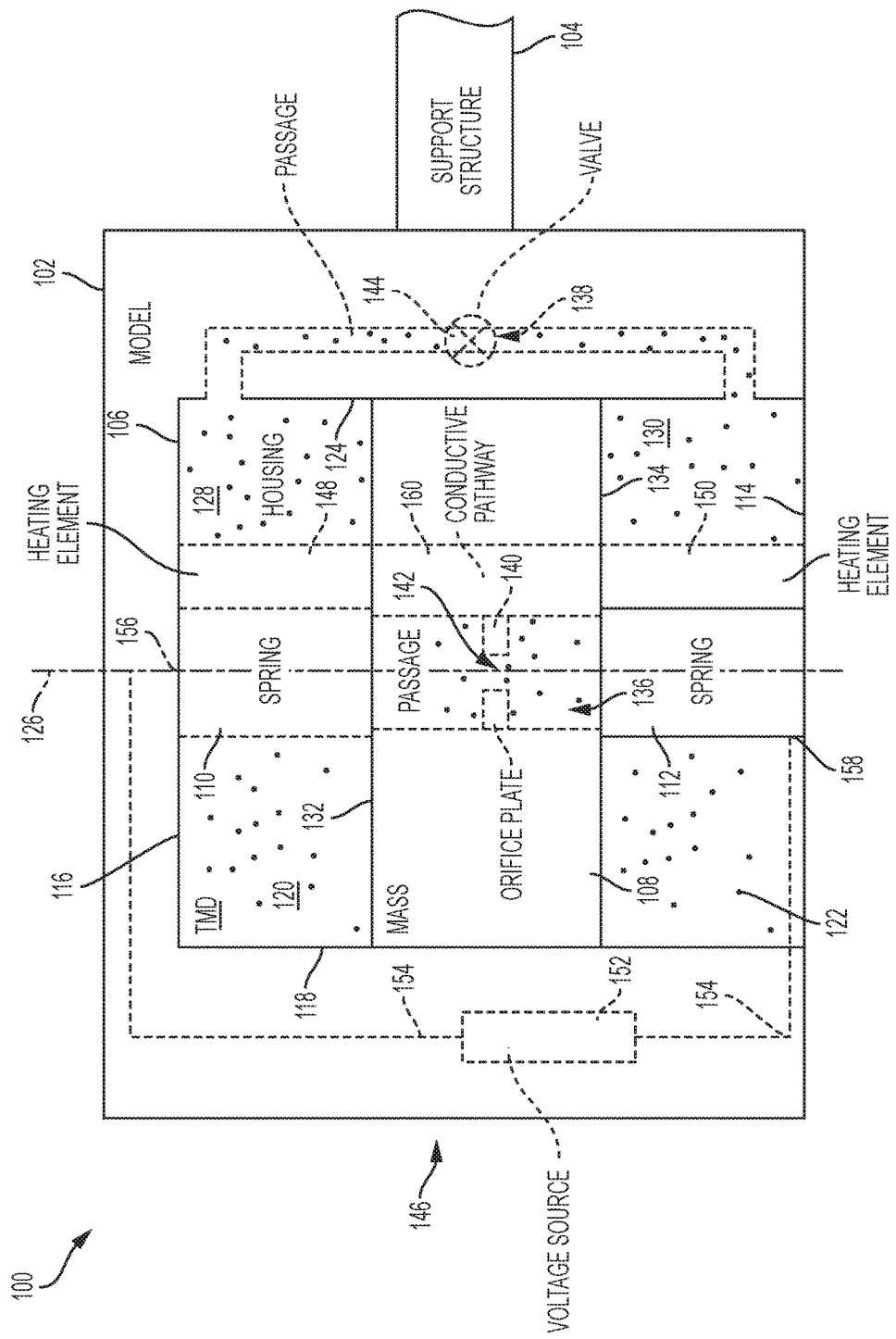
FIG. 2 is a schematic block diagram of a tunable mass-damping apparatus.

This example describes an illustrative tunable mass-damping apparatus, see FIG. 2.

FIG. 2 is a schematic illustration of a tunable mass-damping (TMD) apparatus, generally indicated at 100, illustrating some of the basic features and elements of a mass damper. Mass damper 100 may be coupled to a wind tunnel model 102 which may, in turn, be supported by a support structure 104 during wind tunnel testing of the model.

Mass-damping apparatus 100 may include a housing 106, a mass 108, and at least one spring, for example an upper spring 110 and a lower spring 112. The housing 106 may have a mounting base 114, a cap 116, and walls 118 extending from the mounting base to the cap. The mounting base, cap, and walls of the housing may define an interior volume 120 containing a fluid 122, such as air, oil, or any other compressible gas or fluid. The term "atmospheric air" may sometimes be used in this disclosure to indicate ordinary air taken from the environment.

The walls 118 of the housing 106 may have an interior surface 124. The interior surface 124 of the walls may be cylindrical. Housing 106 may have an axis 126 which may extend from a center of the mounting base 114 to a center of the cap 116. A cross-section of the interior surface of the walls, taken in a plane perpendicular to axis 126, may be circular, though other shapes are also possible. Whatever the cross-sectional shape of the interior surface of the walls happens to be, this cross-sectional shape may be consistent along axis 126 for at least a portion of the interior surface.

Housing 106 may be configured to be coupled to the wind tunnel model 102. For example, the mounting base 114 of the housing may be configured to couple the housing to the wind tunnel model via screws, bolts, or any other appropriate means.

Mass 108 may be configured to move back and forth in the interior volume 120 of the housing along the axis 126. Mass 108 may be configured to make an airtight seal with the interior surface 124 of the housing, thereby dividing the interior volume into an upper chamber 128 and a lower chamber 130. A cylindrical portion of the interior surface may be disposed between the upper and lower chambers.

Mass damper 100 may be configured so that mass 108 can be conveniently adjusted, either by adding additional sections of mass to an existing section, or by allowing replacement of the mass and selecting a mass with a desired density or weight. In some cases, mass 108 may be chosen to have a weight which is some desired fraction or percent of the weight of the wind tunnel model 102 to be tested. For example, mass 108 may be chosen to have a weight in the range of 0.5%-10% of the weight of the wind tunnel model, or more specifically in the range of 1%-3% of the weight of the wind tunnel model.

Mass-damping apparatus 100 may include only upper spring 110, only lower spring 112, or both the upper spring and the lower spring. One or both of the upper and lower springs may be configured to exert a position-dependent force upon the mass 108. Either or both of the springs may be characterized by a spring constant or an effective spring constant chosen based on a natural frequency of the support structure 104 of the wind tunnel model 102.

The upper spring may be configured to exert a force upon an upper side 132 of the mass and the lower spring may be configured to exert a force upon a lower side 134 of the mass. The upper side may be substantially opposite the lower side of the mass. In other embodiments, a mass damper may include only one or more alternative elements configured to exert position-dependent forces upon mass 108, such as elastomers, struts, or the like.

Mass-damping apparatus 100 may include a passage fluidly connecting upper chamber 128 and lower chamber 130. The passage may be an internal passage 136 through the mass or an external passage 138 that connects the upper and lower chambers external to housing 106. Either internal passage 136 or external passage 138 may allow fluid 122 to pass between the two chambers, thereby altering the pressure in each chamber. For example, if the pressure of gas 122 in the upper chamber were higher than the pressure of the gas in the lower chamber, perhaps as a result of a vertical movement of mass 108, then gas may flow from the upper chamber to the lower chamber through passage 136 or 138, thereby lowering the pressure in the upper chamber and raising the pressure in the lower chamber.

Mass-damping apparatus 100 may include a valve configured to control the rate of gas or fluid flow through the passage. In the case where apparatus 100 includes internal passage 136 through mass 108, a valve may take the form of one or more orifice plates 140. In some examples, orifice plate 140 may be one of a set of orifice plates. Each of the set of orifice plates may be configured to restrict the flow of gas through internal passage 136 as mass 108 moves. Each of the set of orifice plates may include a differently sized orifice 142. The different orifice plates may thus provide different levels of restriction to the flow of gas through the passage. To change orifice plates, apparatus 100 may be slightly dismantled, perhaps by removing cap 116 and upper spring 110, and a first orifice plate having a first orifice of a first size replaced with a second orifice plate having a second orifice of a second size different than the first size. In some examples, orifice plate 140 may be a single orifice plate having an adjustable orifice similar to an optical iris.

In the case where apparatus 100 includes external passage 138, a valve may take the form of an external valve 144 disposed in the external passage. Valve 144 may include one aperture, through which fluid may pass, or a plurality of apertures. Valve 144 may include any suitable mechanism for controlling the amount of air or other working fluid that can pass through the valve. Valve 144 may be a faucet valve, though a ball valve or a needle valve could be used as well. In any case, the use of a valve that regulates flow through external passage 138 may allow the amount of damping force exerted on mass 108 to be conveniently adjusted to a desired level, without disassembling the mass damper.

One or both of upper spring 110 and lower spring 112 may have a temperature-dependent spring constant. That is, one or both of the springs may be characterized by a variable spring constant, where the spring constant of the spring depends upon the temperature of the spring. The spring may be chosen based on a variable natural frequency of the support structure 104 of the wind tunnel model 102. The variable spring constant may be established with a nickel-titanium alloy spring heated to at least one calibrated temperature that corresponds to a predetermined spring constant.

Any spring exhibiting a phase-changing temperature-dependent spring constant may be used. Such materials may be referred to as shape memory alloys. A class of shape memory alloy springs are composed of a metal alloy of nickel (Ni) and titanium (Ti), herein referred to as "NiTi". A specific example of a nickel titanium alloy is nitinol. NiTi usually includes roughly equal amounts of Ni and Ti. As the temperature of NiTi increases, NiTi shifts between a martensitic phase and an austenitic phase, resulting in a change in shear modulus in the material. This shift results in a spring constant change that allows an effective absorption frequency of mass damper 100 to be tuned to match the natural vibration frequency of the support structure 104. If the natural vibration frequency of the support structure changes, the temperature of the spring(s) can be altered further, thereby maintaining the tuning of the apparatus to the changing natural vibrations of the support structure.

The NiTi spring(s) used in apparatus 100 may have any appropriate spring constant at room temperature. Increasing the temperature of the spring(s) may increase the spring constant of the spring(s), and the increase may be nonlinear. In some examples, increasing the temperature from 100° F. to 130° F. may result in a doubling of the spring constant. In some examples, lower spring 112 may have a room-temperature spring constant in a range of 20-50 pounds per inch and upper spring 110 may have a room-temperature spring constant in a range of 10-30 pounds per inch.

The temperature range over which the NiTi spring(s) are configured to operate may depend upon the natural vibration frequencies of the support structure, as well as other factors such as the temperature conditions of the wind tunnel, and many temperature ranges are possible. For example, some wind tunnel tests are conducted at very low temperatures to simulate conditions at high altitude. In such cryogenic tests, the spring(s) may be "heated" to a temperature that is considerably less than room temperature, but is greater than the temperature in the rest of the wind tunnel.

Mass-damping apparatus 100 may include a temperature control assembly 146 configured to raise the temperature of upper spring 110 and/or lower spring 112 and thereby alter the spring constant of the spring(s). In some examples, temperature control assembly 146 may include a heating element configured to raise the temperature of the spring and thereby alter the spring constant of the spring. In cases where apparatus includes upper spring 110 and lower spring 112, apparatus 100 may include an upper heating element 148 configured to raise the temperature of the upper spring and thereby alter the spring constant of the upper spring and a lower heating element 150 configured to raise the temperature of the lower spring and thereby alter the spring constant of the lower spring. The two springs may be set to the same temperature or to different temperatures. The upper and lower heating elements may be disposed proximate the upper and lower springs, respectively.

In some examples, the apparatus 100 and/or temperature control assembly 146 may include a voltage source 152 and electrical connections 154 to either one or both of the upper spring 110 and the lower spring 112. These components may make it possible to run current through either one or both of the upper and lower springs, thereby heating the respective spring(s) through resistive heating. That is, the variable spring constant of the spring may be configured to change in response to a change in the temperature of the spring due to current passing through the spring.

Temperature control assembly 146 may be configured to independently control the temperatures of upper spring 110 and lower spring 112. In some examples, the temperature control assembly may be configured to raise the temperature of the upper spring by passing a first current through the upper spring and to raise the temperature of the lower spring by passing a second current through the lower spring.

In some examples, temperature control assembly 146 may include an upper electrode 156 electrically connected to upper spring 110 and a lower electrode 158 connected to lower spring 112. Mass 108 may further include a conductive pathway 160 which is electrically connected to the upper spring and the lower spring. The temperature control assembly may be configured to raise the temperature of the upper spring and the temperature of the lower spring by passing current through the upper and lower springs. That is, a single current may pass through both the upper and lower springs. The temperature response of the upper and lower springs to the same current may be different, as the upper and lower springs may have different properties, such as mass, spring constant, diameter, Ni/Ti composition, and resistance, among others. In other examples, the temperature responses of the two springs to the same current may be the same.

In the absence of any damping forces, once set in motion mass 108 would oscillate between upper and lower chambers 128 and 130 indefinitely at its natural frequency, in an example of undamped motion. However, the passage of air through internal passage 136 and orifice plate 140, or external passage 138 and valve 144, may provide a variable, velocity-dependent damping force, causing the oscillations of mass 108 to decay or in some cases even preventing oscillations.

In other words, mass damper 100 can be configured to cause mass 108 to undergo underdamped motion (where in the absence of additional forces, the mass would undergo more than one oscillation before coming to rest), critically damped motion (where in the absence of additional forces, the mass would return to equilibrium as quickly as possible without oscillating), or overdamped motion (where in the absence of additional forces, the mass would return to equilibrium without oscillating, but in a longer time than if critically damped). The characterization and mathematical treatment of these various types of damped oscillations are well known and will not be described in further detail in this disclosure.

The natural frequency of apparatus 100 can be adjusted by changing the mass, changing the springs, and/or changing the temperature of one or more of the springs (i.e., changing the effective spring constant). In addition, for a given natural frequency, the degree to which oscillations of the mass are damped can be adjusted by regulating the rate of flow through the passage connecting the upper and lower chambers, which changes the damping force.

Example 3

Figure 3:
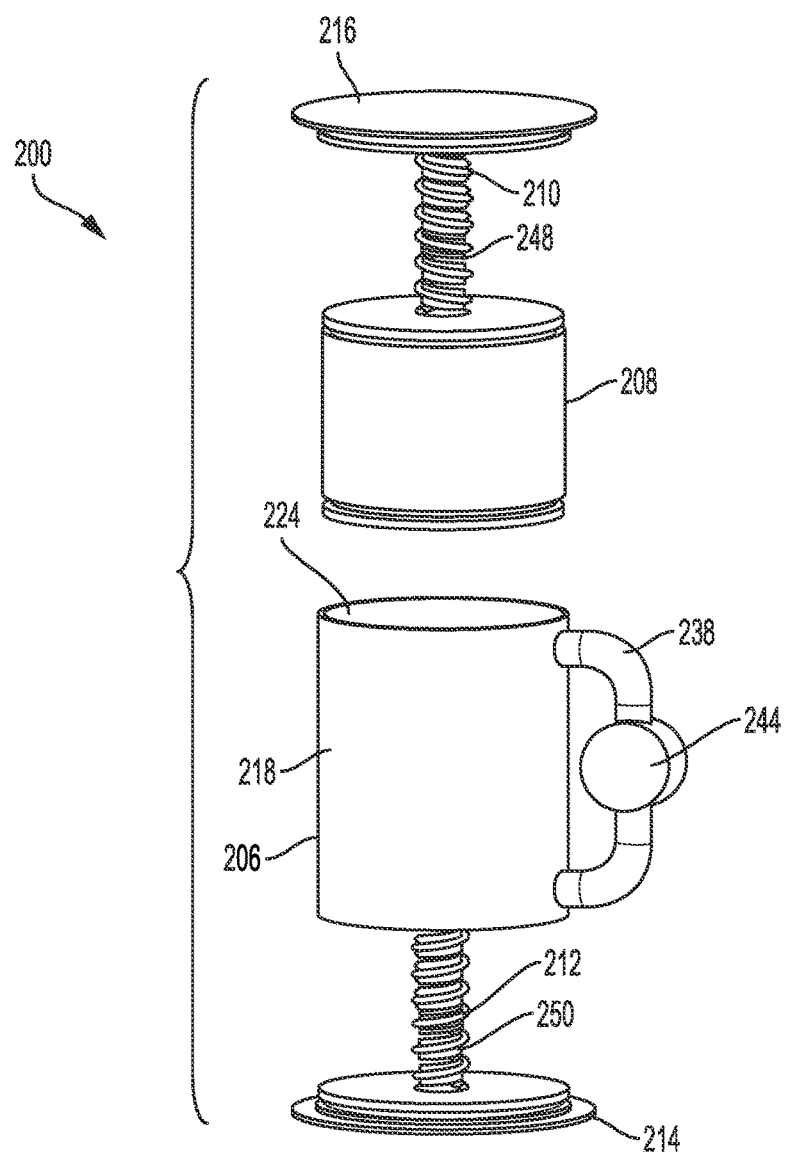
FIG. 3 is an exploded view depicting an embodiment of a tunable mass-damping apparatus.

This example describes an embodiment of a tunable mass-damping apparatus, see FIG. 3.

FIG. 3 is an exploded isometric view of an embodiment of a mass-damping apparatus or mass damper, generally indicated at 200. Mass damper 200 is an embodiment of mass damper 100 described above and the discussion of various features and benefits of mass damper 100 will not be repeated. Similarly numbered and named components of apparatus 200 correspond to the similarly numbered and named components of apparatus 100. For example, mass damper 200 may include a mass 208 which may be similar to mass 108 described above.

Mass damper 200 may include a housing 206 having an interior surface 224. The interior surface of walls 218 may be cylindrical. Mass 208 may be configured to make an airtight seal with the interior surface and may also be cylindrical. More generally a mass damper according to the present teachings may have any desired shape configured to allow a central mass to move back and forth between two chambers. Similarly, the central mass may have any desired shape that can fit within a portion of the mass damper in a substantially airtight manner. For example, a spherical mass might be used within a cylindrical housing.

Mass damper 200 includes an external passage 238 and a corresponding valve 244 configured to regulate the flow of gas or fluid between upper and lower chambers of the apparatus. The external valve may be adjusted from outside housing 206, thereby allowing relatively quick and simple adjustment of the damping characteristics of the apparatus.

Apparatus 200 includes an upper heating element 248 configured to raise the temperature of upper spring 210 and thereby alter the spring constant of the upper spring. Apparatus 200 includes a lower heating element 250 configured to raise the temperature of lower spring 212 and thereby alter the spring constant of the lower spring. The upper and lower heating elements may be operated independently of one another.

In some examples, apparatus 200 may include a temperature control assembly. Upper heating element 248 may be operatively coupled to the temperature control assembly, for example, via one or more wires penetrating through a cap 216 of housing 206. Lower heating element 250 may be operatively coupled to the temperature control assembly, for example, via one or more wires penetrating through a mounting base 214 of housing 206.

In some examples, the upper and lower heating elements 248 and 250 may be operatively coupled to one another through mass 208. For example, if the upper and lower heating elements are both ohmic heating devices configured to carry electrical current, mass 208 may include a conductive pathway from the upper heating element to the lower heating element so that a current can pass from the upper heating element to the lower heating element through the mass.

Example 4

Figure 4:
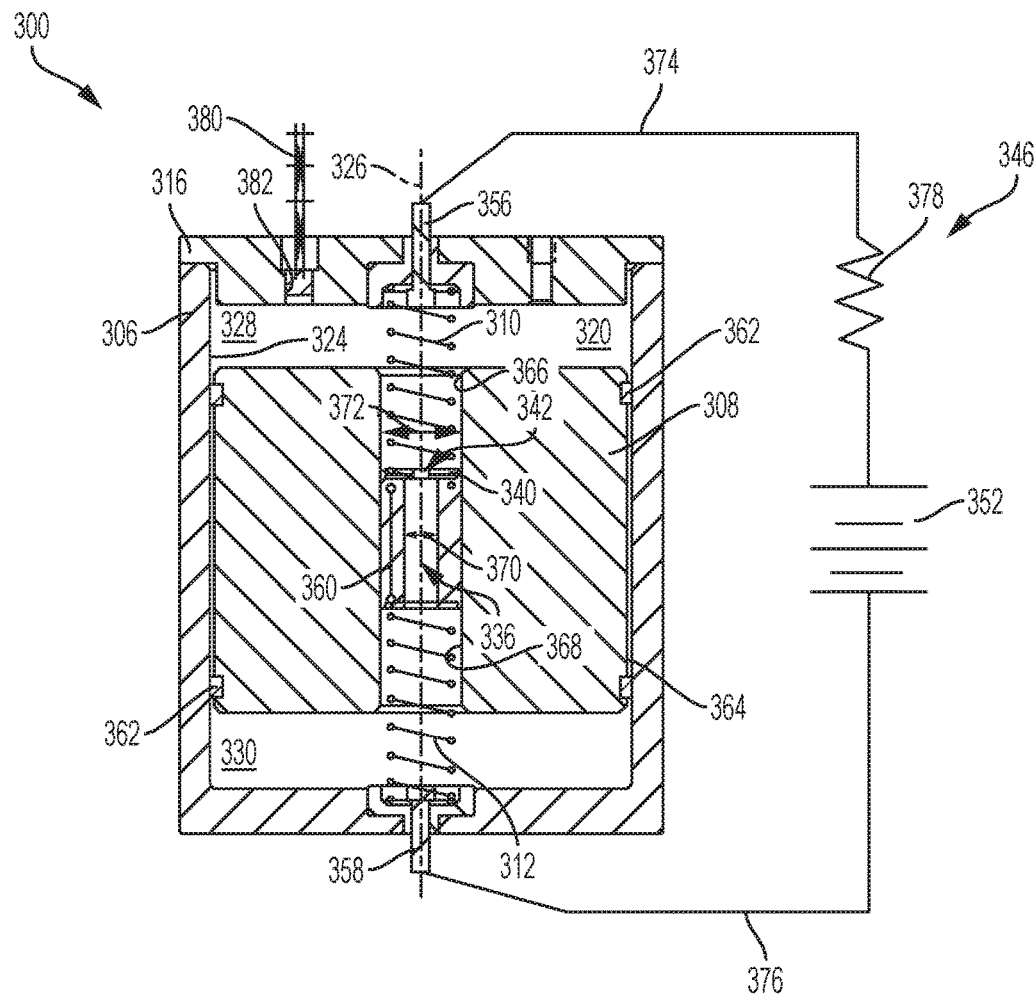
FIG. 4 shows a cross-sectional view of another embodiment of a tunable mass-damping apparatus.

This example describes another embodiment of a tunable mass-damping apparatus, see FIG. 4.

FIG. 4 is a schematic cross-sectional view of another embodiment of a mass-damping apparatus or mass damper, generally indicated at 300. Mass damper 300 is an embodiment of mass damper 100 described above and the discussion of various features and benefits of mass damper 100 will not be repeated. Similarly numbered and named components of apparatus 300 correspond to the similarly numbered and named components of apparatus 100. For example, mass damper 300 may include a mass 308 which may be similar to mass 108 described above.

Apparatus 300 may include a housing 306 having an interior surface 324, an interior volume 320 containing a gas, and an axis 326. Mass 308 may be configured to move back and forth in the interior volume 320 along the axis 326. The mass may be configured to make an airtight seal with the interior surface 324 of the housing, thereby dividing the interior volume of the housing into an upper chamber 328 and a lower chamber 330.

Mass 308 may make an airtight seal with the interior surface 324 of housing 306 via one or more sealing members. For example, two sealing members 362 in the form of rings may be disposed around an outer edge 364 of the mass and may make contact with the interior surface of the housing. The sealing members may be made of Teflon, rubber, or any other suitable material. It is also possible for the mass to fit within the interior surface in a substantially airtight manner without sealing members, and any of the embodiments shown and described by the present teachings may or may not incorporate a set of sealing members in order to maintain an airtight seal.

Mass damper 300 includes an internal passage 336 and a corresponding orifice plate 340 configured to regulate flow of gas or fluid between upper chamber 328 and lower chamber 330. The damping provided by the orifice plate may be adjusted by changing the size of an orifice 342 in the orifice plate or by replacing the orifice plate with a different orifice plate having a differently-sized orifice. An apparatus having an internal passage, such as mass damper 300, may occupy less space within a wind tunnel model as compared to an apparatus having an external passage, such as mass damper 200 described above. At the same time, it may be more time consuming to adjust the damping parameters of an apparatus having an internal passage as compared to an apparatus having an external passage.

Mass 308 may include an upper bore 366 which may fluidly connect the upper chamber 328 and the passage 336. Mass 308 may include a lower bore 368 which may fluidly connect the lower chamber 330 and the passage 336. Upper spring 310 may be seated in upper bore 366. Lower spring 312 may be seated in lower bore 368.

The orifice plate 340 may be configured to be seated in upper bore 366 or lower bore 368, though upper bore 366 may be more convenient for changing orifice plates. The orifice plate may be configured to be held in place the bore by a spring, for example in upper bore 366 by upper spring 310. In order for the spring to securely hold the orifice plate in place in the bore, the spring, orifice plate, bore, and passage may be appropriately sized. For example, passage 336 may have a first lateral dimension 370, while orifice plate 340, the upper spring 310, and the upper bore 366 may each have a substantially common second lateral dimension 372 that is larger than first lateral dimension 370. Thus the orifice plate may sit in the upper bore so that lateral motion of the orifice plate is constrained by the upper bore itself and axial motion of the orifice plate is constrained by the upper spring.

Apparatus 300 may include a temperature control assembly 346 configured to raise the temperature of either or both of the springs 310 and 312 and thereby alter the spring constant of either or both of the springs. Temperature control assembly 346 may include a voltage source 352 and electrical connections to the upper and lower springs.

In some examples, the electrical connections may include an upper electrode 356 in electrical contact with upper spring 310 and an upper wire 374 configured to carry current between the voltage source and the upper spring. The electrical connections may further include a lower electrode 358 in electrical contact with lower spring 312 and a lower wire 376 configured to carry current between the voltage source and the lower spring. Mass 108 may include a conductive pathway 360 configured to carry current between the upper and lower springs. Thus, a single loop circuit may be formed including the voltage source, the upper electrode, the upper spring, the conductive pathway through the mass, the lower spring, and the lower electrode. The single loop circuit may also include orifice plate 340. The temperature control assembly may be configured to raise the temperature of the upper and lower springs by passing current through the circuit. The temperature control assembly may optionally include a component 378 configured to vary the current passing to the upper and lower springs, such as a variable resistor.

In some examples, it may be desirable to independently control the temperatures of upper spring 310 and lower spring 312. In these cases it may be desirable to pass a first current through the upper spring and a second current through the lower spring, with the first current different from the second current. The electrical connections between the upper spring and the voltage source may include additional wires not shown in FIG. 4 so that a first complete circuit loop including the upper spring, and not the lower spring, may carry the first current. The electrical connections between the lower spring and the voltage source may include additional wires not shown in FIG. 4 so that a second complete circuit loop including the lower spring, and not the upper spring, may carry the second current. In these cases it may not be necessary to have a conductive pathway through mass 308.

Mass damping apparatus 300 may include a position sensor 380. Position sensor 380 may be configured to measure a sequence of positions of mass 308 as it oscillates. Such measurements may allow a user to determine oscillations characteristics of the mass damper, such as an oscillation frequency or a damping time. Position sensor 380 may pass through a position sensor port 382 on cap 316 of the mass damper in a substantially airtight manner. Thus may the position sensor be able to "see" the mass inside the damper and communicate measurements to a user outside the damper. The position sensor may include an infrared light and a photodiode detector. Alternately, position sensor may include components to send and detect sound waves. Any suitable position sensor may be used.

As described previously with respect to the schematic depiction of a mass damper in FIG. 2, mass damper 300 of FIG. 4 can provide a desired degree of damping to the motion of mass 308. Specifically, by adjusting the amount of the mass, the spring constant or effective spring constant of the springs, the temperature of the springs, and/or the rate of flow through the passage connecting the upper and lower chambers, mass 308 may be configured to oscillate at any desired frequency, and the motion of mass 308 can be underdamped, critically damped, or overdamped. Typically, but not always, it may be desirable to achieve critical damping corresponding to a particular natural frequency of vibration, which can be obtained through the appropriate selection of mass, springs, and spring temperatures. Any adjustments to the amount of damping can then be made by adjusting the flow through passage 336 with orifice plates 340.

It will be appreciated that various features and components of mass damper 200 could be combined with various features and components of mass damper 300, and vice versa. A few non-limiting examples of such combinations will now be discussed. In some examples, mass damper 200, including the external passage 238, may include the voltage supply and electrical connections of mass damper 300 in order to provide electrical energy to the heating elements 248 and 250. In some examples, any of the temperature control components of mass damper 300 may be included with mass damper 200 in order to heat springs 210 and 212 via resistive heating of springs 210 and 212. In some examples, mass damper 200, including heating elements 248 and 250, may include an internal passage for gas flow such as shown and described in reference to mass damper 300 instead of external passage 238.

Example 5

Figure 5:
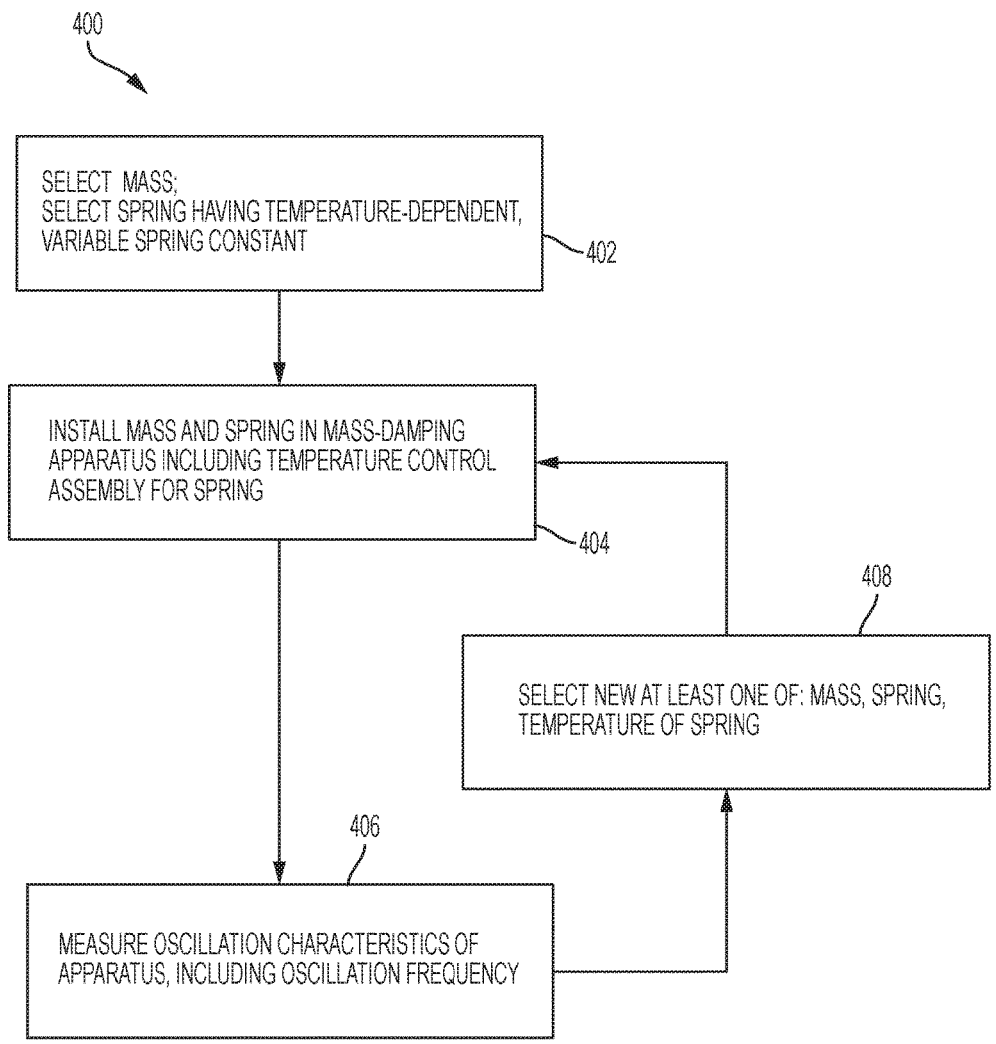
FIG. 5 is a flow chart depicting a method of calibrating a tunable mass-damping apparatus.

This example describes an illustrative method of calibrating a tunable mass-damping apparatus to reduce dynamic forces on a wind tunnel model during wind tunnel testing, which may be used in conjunction with any of the apparatuses described herein; see FIG. 5.

FIG. 5 depicts multiple steps of a method, generally indicated at 400 of calibrating a tunable mass-damping apparatus to reduce dynamic forces on a wind tunnel model during wind tunnel testing. Method 400 may be used in conjunction with any of the mass-damping apparatuses depicted in and described in reference to FIGS. 1-4. Although various steps of method 400 are described below and depicted in FIG. 5, the steps need not necessarily all be performed, in some cases may be performed in a different order than the order shown, and in some cases may be performed more than once.

Method 400 may include a step 402 of selecting a mass and a spring having a temperature-dependent, variable spring constant. Any suitable mass may be selected, and there may be a variety of selection criteria that determine which mass is chosen, with the ultimate goal of matching the natural frequency of the mass when used in a mass damper to a natural frequency of vibration resulting from the coupling of a model to a support structure. One possible choice is to select a mass with a weight based on or equal to a predetermined percentage of weight of a wind tunnel model. For example, the predetermined percentage may be in the range of 0.5 to 10 percent of the weight of the wind tunnel model, though other ranges may be chosen as well. Another possible choice is to choose the largest mass possible within the constraint that the mass damper, including the selected mass, must fit within the available space within the wind tunnel model.

The selected spring may have a spring constant chosen based on a natural frequency to be damped, in combination with the mass selected. For example, the spring constant may be chosen so that a mass damper constructed from the chosen mass and spring(s) will match a natural frequency of a support structure for the wind tunnel model, and thereby reduce vibrations of the wind tunnel model at that frequency. Selecting a spring may include selecting two springs, or any number of desired springs. When more than one spring is selected, the springs may collectively have an effective spring constant that is chosen based on one or more natural frequencies, as described above in the case of one spring. The spring or springs may be chosen to leave vibration of the wind tunnel model which originate from aerodynamic performance of the wind tunnel model undamped.

Selecting a spring may include selecting a temperature of the spring. As the spring constant of the selected spring may depend upon the temperature of the selected spring, the temperature of the spring may be selected so that the spring has the appropriate spring constant that will allow the mass damper to absorb vibrations at the desired frequency.

Method 400 may include a step 404 of installing the mass and the spring in a mass-damping apparatus. The mass-damping apparatus may be of the general type shown in FIGS. 1-4 and discussed previously. That is, the mass-damping apparatus may allow the mass to move back and forth between upper and lower fluid-filled or gas-filled chambers while the spring exerts a position-dependent forces upon the mass. As the mass moves, gas may pass between the upper and lower fluid-filled chambers. The gas may be atmospheric air. The mass damping apparatus may include a temperature control assembly configured to raise the temperature of the spring.

The mass-damping apparatus may include a housing that defines the upper and lower gas-filled chambers. The housing may include a cylindrical central portion between the upper and lower gas-filled chambers for receiving the mass. The mass may be received in the central portion in a substantially airtight manner. The housing may include a mounting base configured to couple the housing to the wind tunnel model. For example, the mounting base could be attached to the model by screws, bolts, or other similar fastening hardware, although many other attachment means such as adhesive attachment are also possible.

The mass-damping apparatus may include a valve configured to regulate air flow through a passage between the upper and lower gas-filled chambers. In some examples, the passage may be an external passage that connects the upper and lower chambers outside of the housing and the valve may be an external valve accessible from outside the housing. In some examples, the passage may be an internal passage that connects the upper and lower chambers through the mass inside the housing and the valve may be an internal orifice plate disposed within the internal passage.

The mass-damping apparatus, or the temperature control assembly within the mass-damping apparatus, may include a heating element associated with the selected spring. In the case where the apparatus includes two or more springs, the temperature assembly may include two or more heating elements, with each heating element associated with one of the springs.

Method 400 may include a step 406 of measuring oscillation characteristics of the assembled mass-damping apparatus, including an oscillation frequency of the mass. Measuring oscillation characteristics of the apparatus may further include measuring a characteristic damping time of the mass. Measuring the oscillation characteristics of the apparatus may include exciting oscillations of the mass and measuring a sequence of subsequent positions of the mass as the mass exhibits undriven, damped oscillation. The mass-damping apparatus may include a position sensor for this purpose.

The oscillation frequency of the mass may be determined by the amount of the selected mass, the spring constant or effective spring constant of the one or more springs, the temperature of the one or more springs, and the damping force provided.

The characteristic damping time of the mass may be the amount of time required for the mass to return to an equilibrium position after being displaced a distance from that equilibrium position. Alternately, in the case where the mass exhibits underdamped oscillation, the characteristic damping time may be the amount of time required for the amplitude of the oscillation to reach a predetermined fraction of the initial oscillation amplitude. The characteristic damping time may be a function of the damping force provided.

Step 406 may be performed in a laboratory setting instead of a wind tunnel. Thus may the properties of the mass-damping apparatus be studied and determined without confounding effects of a wind tunnel model or a wind tunnel model support structure. Once the oscillation characteristics of the assembled apparatus are determined, the apparatus may be installed in a wind tunnel model supported by a support structure.

Method 400 may include a step 408 of selecting a new at least one of the mass, the spring, and the temperature of the spring. That is, the selected mass described above may be a first mass and method 400 may include selecting a second mass. The second mass may have a different mass as measured in kilograms than the first mass. The second mass may be sized to fit within the same mass-damping apparatus as the first mass or may be sized to fit within a different mass-damping apparatus. Changing only the mass in the mass-damping apparatus may change the oscillation frequency of the apparatus.

The spring described above may be a first spring and method 400 may include selecting a second spring. The second spring may have a different spring constant or effective spring constant that the first spring. Changing only the spring in the mass-damping apparatus may change the oscillation frequency of the apparatus. Note, the change from a first spring to a second spring should not be confused with the addition of an upper spring to a device that already includes a lower spring. Rather, changing from a first spring to a second spring may, for example, entail replacing a first upper spring with a second upper spring.

Step 408 may include altering the variable spring constant of the spring via the temperature control assembly. That is, the selected temperature of the spring in step 402 may be a first temperature and step 408 may include selecting a second temperature that is different from the first temperature. As the spring constant of the spring may be variable and temperature-dependent, changing the temperature of the spring from a first to a second temperature may alter the spring constant of the spring. Altering the spring constant of the spring may change the oscillation frequency of the apparatus. Note, changing the oscillation frequency of the apparatus by altering the variable spring constant of the spring may be performed without dismantling or even physically accessing the apparatus by a user, and could be performed remotely.

The temperature control assembly may include an ohmic heating device. Altering the variable spring constant of the spring via the temperature control assembly may include causing current to flow through the ohmic heating device. In some examples, the ohmic heating device may be a heating element disposed proximate the spring. In some examples, the ohmic heating device may be the spring itself, as the temperature of the spring may rise if current passes through the spring.

The temperature control assembly may include a voltage source and electrical connections to either a heating element or to the spring. In some examples, altering the variable spring constant of the spring via the temperature control assembly may include causing current to flow through the spring. In some examples, altering the variable spring constant of the spring via the temperature control assembly may include causing current to flow to a heating element associated with the spring.

Step 408 may include altering the damping characteristics of the apparatus. In some examples, altering the damping characteristics of the apparatus may include adjusting air flow through a passage using a valve. In some examples, altering the damping characteristics of the apparatus may include adjusting air flow through a passage using by changing the size of an orifice disposed within the passage. Changing the damping characteristics of the apparatus may change the oscillation frequency and the damping time of the apparatus.

Method steps 404, 406, and 408 may be part of a feedback loop. That is, once a new at least one of the mass, spring(s), or temperature of the springs has been selected, method 400 may return to step 404 where the new mass or spring(s) is installed in a mass-damping apparatus, or the temperature of the spring(s) is changed, and on to step 406 where the new oscillation characteristics of the newly configured apparatus are measured. For example, method 400 may include changing the temperature of the spring from a first temperature to a second temperature and measuring oscillation characteristics of the mass-damping apparatus with the spring at the new temperature.

A catalog of mass-damping apparatus configurations and their oscillation characteristics may thus be created. When a wind tunnel test of a model aircraft is to be performed, the optimal oscillation and damping characteristics of a mass-damping apparatus may be determined and the appropriate configuration of mass, spring(s), and spring temperatures may be selected so as to reduce dynamic forces on the model, perhaps due to vibrations which originate from the support structure of the model, while leaving vibrations which originate from the aerodynamic performance of the model undamped.

Installing the selected components of the mass-damping apparatus and installing the apparatus within the wind tunnel model may be time consuming. By determining the required oscillation and damping characteristics beforehand, instead of adjusting parameters once the apparatus has been installed in the wind tunnel, valuable time in the wind tunnel may be saved. Time may be further saved once the apparatus has been installed, as the oscillation frequency of the apparatus may be changed remotely without accessing the apparatus by altering the variable spring constant of the spring via the temperature control assembly.

Example 6

Figure 6:
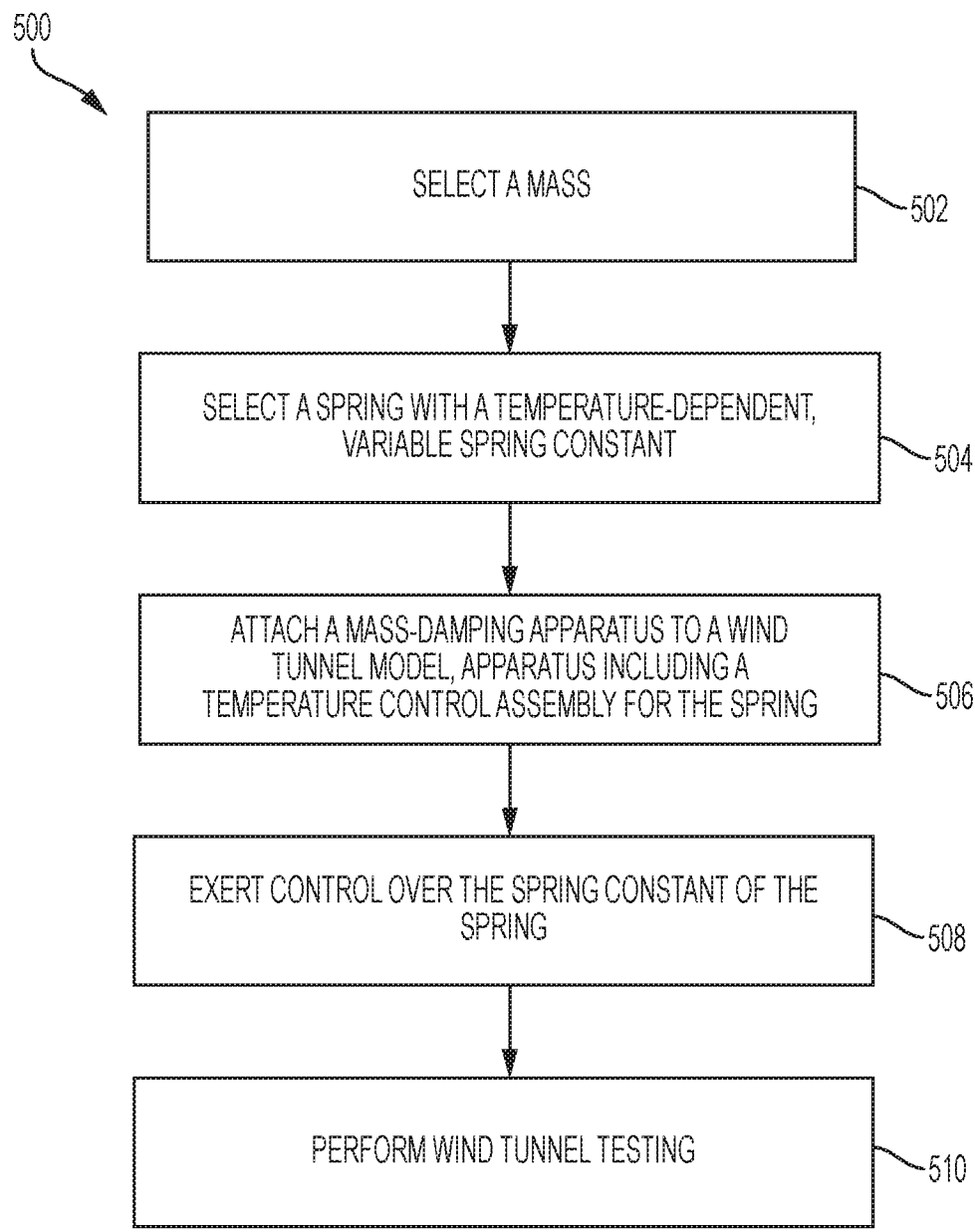
FIG. 6 is a flow chart depicting a method of reducing dynamic forces on a wind tunnel model during wind tunnel testing.

This example describes an illustrative method of reducing dynamic forces on a wind tunnel model during wind tunnel testing, which may be used in conjunction with any of the apparatuses described herein; see FIG. 6.

FIG. 6 depicts multiple steps of a method, generally indicated at 500 of reducing dynamic forces on a wind tunnel model during wind tunnel testing. Method 500 may be used in conjunction with any of the mass-damping apparatuses depicted in and described in reference to FIGS. 1-4. Although various steps of method 500 are described below and depicted in FIG. 6, the steps need not necessarily all be performed, in some cases may be performed in a different order than the order shown, in some cases may be performed more than once, and in some cases may be performed simultaneously.

Method 500 may include a step 502 of selecting a mass. Any suitable mass may be selected, and there may be a variety of selection criteria that determine which mass is chosen, with the ultimate goal of matching the natural frequency of the mass when used in a mass damper to a natural frequency of vibration resulting from the coupling of a model to a support structure. One possible choice is to select a mass with a weight based on or equal to a predetermined percentage of weight of a wind tunnel model. For example, the predetermined percentage may be in the range of 0.5 to 10 percent of the weight of the wind tunnel model, though other ranges may be chosen as well. Another possible choice is to choose the largest mass possible within the constraint that the mass damper, including the selected mass, must fit within the available space within the wind tunnel model.

Method 500 may include a step 504 of selecting a spring with a temperature-dependent, variable spring constant. The spring constant of the spring may be chosen based on a natural frequency of a support structure for the wind tunnel model. For example, the spring may be chosen so that a mass damper constructed from the chosen mass and spring(s) will match a natural frequency of a support structure for the wind tunnel model, and thereby reduce vibrations of the wind tunnel model at that frequency when the spring is at a particular temperature. Selecting at least one spring may include selecting at least two springs, or any number of desired springs. When more than one spring is selected, the springs may collectively have an effective spring constant that is chosen based on one or more natural frequencies of the support structure, as described above in the case of one spring. Selecting a spring may include selecting a spring chosen to leave vibrations of the wind tunnel model which originate from aerodynamic performance of the wind tunnel model undamped.

Method 500 may include a step 506 of attaching a mass-damping apparatus to a wind tunnel model. The mass-damping apparatus may be of the general type shown in FIGS. 1-4 and described previously. Accordingly, the mass-damping apparatus may include a housing having an interior surface, an interior volume containing a gas, and an axis. As described previously, the gas may be atmospheric air or any other suitable gas or fluid. The mass-damping apparatus may include the selected mass and the selected spring. The mass damping apparatus may include a temperature control assembly configured to raise the temperature of the spring.

The interior surface of the housing may be cylindrical and may be configured to receive the mass. The housing may include a mounting base configured to couple the housing to the wind tunnel model.

The mass-damping apparatus may include a valve configured to regulate air flow through a passage between the upper and lower gas-filled chambers. In some examples, the passage may be an external passage that connects the upper and lower chambers outside of the housing and the valve may be an external valve accessible from outside the housing. In some examples, the passage may be an internal passage that connects the upper and lower chambers through the mass inside the housing and the valve may be an internal orifice plate disposed within the internal passage.

The selected mass may be configured to move back and forth in the interior volume along the axis. The mass may be configured to make an airtight seal with the interior surface of the housing, thereby dividing the interior volume into an upper chamber and a lower chamber.

Also as described previously, as the mass moves back and forth, the springs or other force-providing elements may be configured to exert a position-dependent force upon the mass, directed towards an equilibrium position of the mass and increasing in magnitude as the mass moves farther away from its equilibrium position.

The mass-damping apparatus, or the temperature control assembly within the mass-damping apparatus, may include a heating element associated with the selected spring. In the case where the apparatus includes two or more springs, the temperature assembly may include two or more heating elements, with each heating element associated with one of the springs.

Method 500 may include a step 508 of exerting control over the spring constant of the spring via the temperature control assembly. That is, a desired temperature of the spring may be maintained through actions of the temperature control assembly. In an example, if the apparatus is meant to absorb vibrations of the model due to vibrations of the support structure at 7.2 Hz and the apparatus is known to absorb vibrations at that frequency when the spring is held at 105° F., then the temperature control mechanism may activate, for instance, a heating element in order to hold the spring at that temperature during testing.

The temperature control assembly may include an ohmic heating device. Exerting control over the spring constant of the spring via the temperature control assembly may include causing current to flow through the ohmic heating device. In some examples, the ohmic heating device may be a heating element disposed proximate the spring. In some examples, the ohmic heating device may be the spring itself, as the temperature of the spring may rise if current passes through the spring.

The temperature control assembly may include a voltage source and electrical connections to either a heating element or to the spring. In some examples, exerting control over the spring constant of the spring via the temperature control assembly may include causing current to flow through the spring. In some examples, exerting control over the spring constant of the spring via the temperature control assembly may include causing current to flow to a heating element associated with the spring. In some examples, the apparatus may include two springs and the temperature control assembly may include two heating elements, with each heating element associated with each of the two springs.

Method 500 may include a step 510 of performing wind tunnel testing upon the model. Wind tunnel testing will typically include mounting the model on a support structure and directing air flow over the model. The model may be outfitted with a suite of instruments designed to measure, for example, forces on the model during testing. Some of these forces may come from the aerodynamic performance of the model and some may come from the support structure that is holding the model. These latter forces are an artifact of the test and would not be present during real-life operation. Hence, reducing the forces caused by vibrations of the support structure would improve the accuracy of the test. If these forces were too large they could even pose a danger to the model. Reducing them would allow the model to be tested under a greater range of conditions.

It is possible at steps 502, 504, and 508 to select a mass and one or more springs, along with the temperatures of those springs, so that the mass-damping apparatus has a natural vibration frequency in common with the support structure, or with the combination of the support structure and the model. Since the support structure is attached to the model, and the model is attached to the mass-damping apparatus at step 506, vibrations of the support structure may be transferred to the mass-damping apparatus instead of the model. Thus, tuning the mass-damping apparatus to the natural frequency of the support structure by appropriate selection of a mass and an effective spring constant reduces undesirable artifact forces on the model during testing.

In some examples, the natural vibration frequencies of the support structure may change due to changes in testing parameters such as wind speed and tunnel temperature. In these examples, it may be advantageous to be able to change the frequency to which the mass damper is tuned so that the above-mentioned benefits of using the mass damper still apply. It may be quite advantageous to be able to change the absorbing frequency of the mass damper without having to dismantle the mass damper or the wind tunnel model.

Method 500 may include changing the spring constant of the spring from a first predetermined spring constant to a second predetermined spring constant by changing a temperature of the spring from a first calibrated temperature to a second calibrated temperature. In some examples, the step of changing the spring constant of the spring may be performed in between data-taking test runs of the wind tunnel when testing parameters are being changed. In some examples, the step of changing the spring constant of the spring may be performed at substantially the same time as step 510, that is, while wind tunnel testing is being performed. As the spring constant may be changed remotely, changing the spring constant during testing may be part of an active feedback control loop wherein the mass damper can adjust to changing vibrational frequencies of the support structure during an actual wind tunnel test.

A mass-damping apparatus according to the present teachings is thus tunable both in the sense that different masses and springs may be chosen to change the natural vibrational frequency of the mass-damping apparatus, and in the sense that spring constants of given springs may be changed in order to change the natural vibrational frequency of the mass-damping apparatus. In particular, this second sense of tuning may be accomplished remotely. Further mass-damping apparatuses according to the present teachings are tunable in that the damping force can be conveniently adjusted to change the rate at which the mass damper reduces undesirable vibrations.

Example 7

Figure 7:
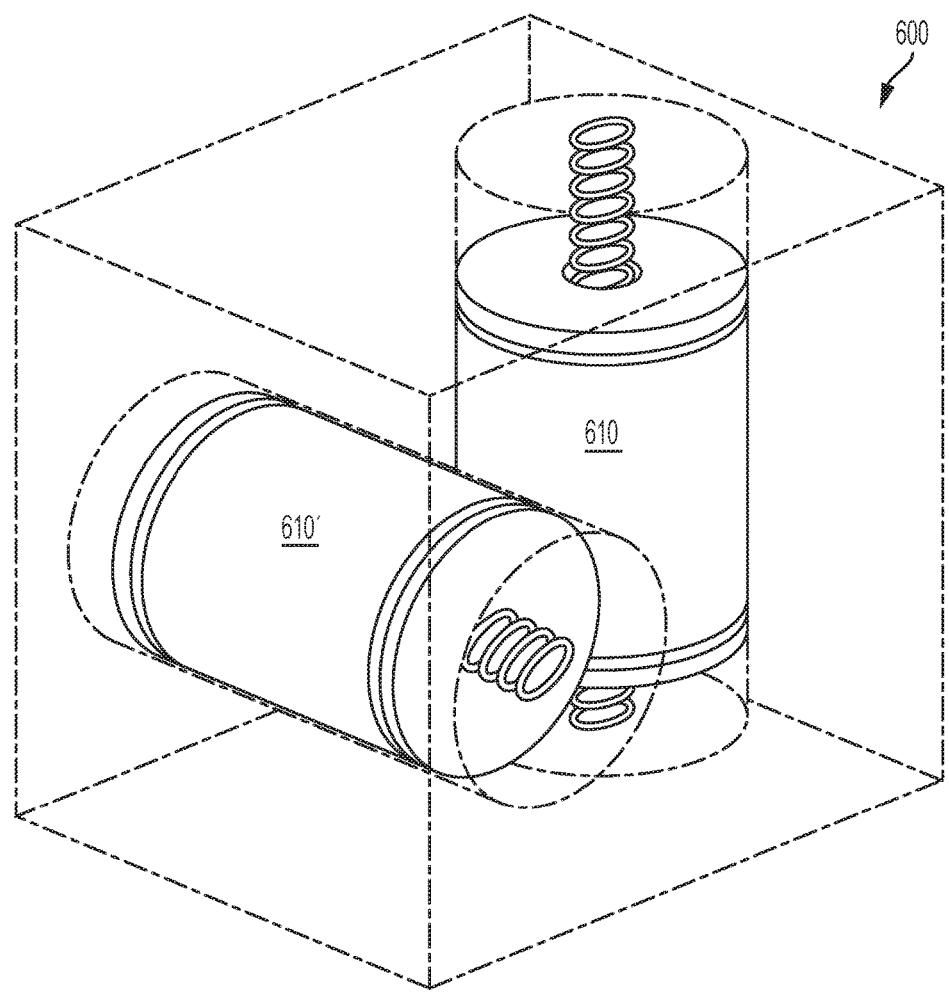
FIG. 7 is a schematic illustration of a multi-directional tunable mass-damping apparatus.

This example describes an embodiment of a multi-directional tunable mass-damping apparatus, see FIG. 7.

FIG. 7 is a schematic illustration of a multi-directional tunable mass-damping apparatus, generally indicated at 600. Such an apparatus may be useful because the natural vibration frequencies of a wind tunnel model support structure, the model, or the support structure together with the model may be different in different directions. Further, a uni-directional mass-damping apparatus as described previously may have difficulty absorbing energy from side-to-side vibrations if the apparatus itself is oriented vertically. Apparatus 600 thus incorporates two mass dampers of the type described above, one oriented in a vertical direction as indicated at 610, and one oriented in a horizontal direction as indicated at 610'.

The two mass dampers incorporated into mass-damping apparatus 600 need not be identical. Indeed, the two dampers may be tuned or calibrated independently as described in reference to FIGS. 5 and 6 to absorb energy at different frequencies and/or to dissipate the absorbed energies at different rates, thus further reducing dynamic forces on the model during testing. The two dampers may be oriented perpendicularly to each other, as depicted in FIG. 7, or at any other desired angle with respect to each other. In addition, the dampers may be oriented at any angle with respect to the model. In some cases, three dampers may be used to provide damping along three axes.

In the previous descriptions and drawings the use of terms such as "upper," "lower," "top," "bottom," "first," and "second" are meant to aid in the descriptions of the drawings and are not to be taken to be limiting in any sense, or to imply that the mass-damping apparatus can only be used in a vertical orientation. The embodiments of the mass-damping apparatus shown are illustrative of the principles of the invention and could be altered by a person with knowledge of the art.

Example 8

This section describes additional aspects and features of embodiments, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A tunable mass-damping apparatus, comprising:

a housing having an interior surface, an interior volume containing a fluid, and an axis, the housing configured to be coupled to a wind tunnel model;

a mass configured to move back and forth in the interior volume along the axis, the mass configured to make an airtight seal with the interior surface of the housing, thereby dividing the interior volume into an upper chamber and a lower chamber;

a passage fluidly connecting the upper chamber and the lower chamber; and a spring configured to exert a position-dependent force upon the mass;

wherein the spring is characterized by a variable spring constant chosen based on a variable natural frequency of a support structure of the wind tunnel model; and wherein the variable spring constant is established with a nickel-titanium alloy spring heated to at least one calibrated temperature that corresponds to a predetermined spring constant.

A2. The apparatus of paragraph A1, wherein the interior surface of the housing is cylindrical and the housing includes a mounting base configured to couple the housing to the wind tunnel model.

A3. The apparatus of paragraph A1, wherein the fluid is atmospheric air.

A4. The apparatus of paragraph A1, wherein the mass has a weight in a range of 0.5 to 10 percent of a wind tunnel model.

A5. The apparatus of paragraph A1, further comprising a valve configured to control a rate of fluid flow through the passage.

A6. The apparatus of paragraph A1, further comprising a heating element configured to raise the temperature of the spring and thereby alter the spring constant of the spring.

A7. The apparatus of paragraph A1, further comprising electrical connections configured to electrically connect the spring to a voltage source and the variable spring constant of the spring is configured to change in response to a change in the temperature of the spring due to current passing through the spring.

A8. The apparatus of paragraph A1, wherein the spring is an upper spring configured to exert a force upon an upper side of the mass, the apparatus further comprising a lower spring configured to exert a force on a lower side of the mass substantially opposite the upper side.

A9. The apparatus of paragraph A8, further comprising an upper heating element configured to raise the temperature of the upper spring and thereby alter the spring constant of the upper spring and a lower heating element configured to raise the temperature of the lower spring and thereby alter the spring constant of the lower spring.

B1. A tunable mass-damping apparatus, comprising:

a housing having an interior surface, an interior volume containing a fluid, and an axis, the housing configured to be coupled to a wind tunnel model;

a mass configured to move back and forth in the interior volume along the axis, the mass configured to make an airtight seal with the interior surface of the housing, thereby dividing the interior volume into an upper chamber and a lower chamber;

a passage fluidly connecting the upper chamber and the lower chamber;

a spring configured to exert a position-dependent force upon the mass, the spring having a temperature-dependent spring constant; and a temperature control assembly configured to raise the temperature of the spring and thereby alter the spring constant of the spring;

wherein the spring is chosen based on a natural vibration frequency of a support structure of the wind tunnel model.

B2. The apparatus of paragraph B1, wherein the interior surface of the housing is cylindrical and the housing includes a mounting base configured to couple the housing to the wind tunnel model.

B3. The apparatus of paragraph B1, wherein the fluid is atmospheric air.

B4. The apparatus of paragraph B1, wherein the mass has a weight in a range of 0.5 to 10 percent of a wind tunnel model.

B5. The apparatus of paragraph B1, further comprising a valve configured to control a rate of fluid flow through the passage.

B6. The apparatus of paragraph B1, wherein the temperature-dependent spring constant of the spring is established with a nickel-titanium alloy spring heated to at least one calibrated temperature that corresponds to a predetermined spring constant.

B7. The apparatus of paragraph B1, wherein the spring is an upper spring configured to exert a force upon an upper side of the mass, the apparatus further comprising a lower spring configured to exert a force on a lower side of the mass substantially opposite the upper side.

B8. The apparatus of paragraph B7, wherein the temperature control assembly includes (a) an upper heating element configured to raise the temperature of the upper spring and thereby alter the spring constant of the upper spring and (b) a lower heating element configured to raise the temperature of the lower spring and thereby alter the spring constant of the lower spring.

B9. The apparatus of paragraph B7, wherein the temperature control assembly includes a voltage source and electrical connections to the upper and lower springs, and wherein the temperature control assembly is configured to raise the temperature of the upper spring by passing a first current through the upper spring and to raise the temperature of the lower spring by passing a second current through the lower spring.

B10. The apparatus of paragraph B7, wherein the temperature control assembly includes a voltage source, an upper electrode electrically connected to the upper spring, and a lower electrode electrically connected to the lower spring, wherein the mass includes a conductive pathway which is electrically connected to the upper spring and the lower spring, and wherein the temperature control assembly is configured to raise the temperature of the upper spring and the temperature of the lower spring by passing current through the upper and lower springs.

C1. A method of calibrating a tunable mass-damping apparatus to reduce dynamic forces on a wind tunnel model during wind tunnel testing, comprising:

selecting a mass with weight equal to a predetermined percentage of weight of the wind tunnel model;

selecting a spring with a temperature-dependent, variable spring constant chosen to reduce vibrations of the wind tunnel model at a natural frequency of a support structure for the wind tunnel model;

installing the mass and the spring in the mass-damping apparatus that allows the mass to move back and forth between upper and lower fluid-filled chambers while the spring exerts a position-dependent force upon the mass and while fluid passes between the upper and lower fluid-filled chambers, the mass-damping apparatus including a temperature control assembly configured to raise the temperature of spring;

altering the variable spring constant of the spring via the temperature control assembly; and measuring oscillation characteristics of the mass-damping apparatus including an oscillation frequency of the mass.

C2. The method of paragraph C1, wherein the mass is selected to have a weight in a range of 0.5 to 10 percent of the weight of the wind tunnel model.

C3. The method of paragraph C1, wherein the mass-damping apparatus includes a housing that defines the upper and lower fluid-filled chambers, the housing including a cylindrical central portion between the upper and lower fluid-filled chambers for receiving the mass and a mounting base configured to couple the housing to the wind tunnel model.

C4. The method of paragraph C1, wherein the fluid is atmospheric air.

C5. The method of paragraph C1, wherein the mass-damping apparatus further includes a valve configured to regulate fluid flow through a passage between the upper and lower fluid-filled chambers, and further comprising adjusting fluid flow through the passage using the valve.

C6. The method of paragraph C1, wherein measuring oscillation characteristics of the assembled mass-damping apparatus includes exciting oscillations of the mass and measuring a sequence of subsequent positions of the mass as the mass exhibits undriven, damped oscillation.

C7. The method of paragraph C1, wherein the temperature control assembly includes an ohmic heating device and wherein altering the variable spring constant of the spring via the temperature control assembly includes causing current to flow through the ohmic heating device.

C8. The method of paragraph C1, wherein the temperature control assembly includes a voltage source and electrical connections and wherein altering the variable spring constant of the spring via the temperature control assembly includes causing current to flow through the spring.

C9. The method of paragraph C1, wherein selecting a spring includes selecting a spring chosen to leave vibrations of the wind tunnel model which originate from aerodynamic performance of the wind tunnel model undamped.

C10. The method of paragraph C1, wherein selecting a spring includes selecting two springs which collectively have an effective spring constant chosen to reduce motion of the wind tunnel model at the natural frequency of the support structure.

C11. The method of paragraph C10, wherein the temperature control assembly includes two heating elements, with each heating element associated with each of the two springs.

D1. A method of reducing dynamic forces on a wind tunnel model during wind tunnel testing, comprising:
selecting a mass with weight equal to a predetermined percentage of weight of the wind tunnel model;
selecting a spring with a temperature-dependent, variable spring constant chosen based on a natural frequency of a support structure for the wind tunnel model;
attaching to the wind tunnel model a mass-damping apparatus that includes:
a housing having an interior surface, an interior volume containing a fluid, and an axis, the housing configured to be coupled to the wind tunnel model;
the selected mass configured to move back and forth in the interior volume along the axis, the mass configured to make an airtight seal with the interior surface of the housing, thereby dividing the interior volume into an upper chamber and a lower chamber;
the selected spring configured to exert a position dependent force upon the mass; and
a temperature control assembly configured to raise the temperature of the spring;
exerting control over the spring constant of the spring via the temperature control assembly; and
performing wind tunnel testing on the model.

D2. The method of paragraph D1, wherein the mass is selected to have a weight in a range of 0.5 to 10 percent of the weight of the wind tunnel model.

D3. The method of paragraph D1, wherein a portion of the interior surface of the housing is cylindrical and is configured to receive the mass and the housing includes a mounting base configured to couple the housing to the wind tunnel model.

D4. The method of paragraph D1, wherein the fluid is atmospheric air.

D5. The method of paragraph D1, wherein the mass-damping apparatus further includes a valve configured to regulate fluid flow through a passage between the upper and lower gas-filled chambers.

D6. The method of paragraph D1, further comprising changing the spring constant of the spring from a first predetermined spring constant to a second predetermined spring constant by changing a temperature of the spring from a first calibrated temperature to a second calibrated temperature.

D7. The method of paragraph D1, wherein the temperature control assembly includes an ohmic heating device and wherein exerting control over the spring constant of the spring via the temperature control assembly includes causing current to flow through the ohmic heating device.

D8. The method of paragraph D1, wherein the temperature control assembly includes a voltage source and electrical connections and exerting control over the spring constant of the spring via the temperature control assembly includes causing current to flow through the spring.

D9. The method of paragraph D1, wherein selecting a spring includes selecting a spring chosen to leave vibrations of the wind tunnel model which originate from aerodynamic performance of the wind tunnel model undamped.

D10. The method of paragraph D1, wherein selecting a spring includes selecting two springs which collectively have an effective spring constant chosen to reduce motion of the wind tunnel model at the natural frequency of the support structure.

D11. The method of paragraph D10, wherein the temperature control assembly includes two heating elements, with each heating element associated with each of the two springs.

Advantages, Features, Benefits

The different embodiments of the tunable mass-damping apparatus described herein provide several advantages over known solutions for reducing vibrations of wind tunnel models arising from the support structure of those models. For example, the illustrative embodiments of the mass dampers described herein allow for convenient calibrating and adjusting of the mass-damping apparatus. Additionally, and among other benefits, illustrative embodiments of the tunable mass damper described herein allow wind tunnel testing to be accomplished over an expanded range of angles and test speeds. This may reduce risk to the model, the test facility, and the test program itself by allowing data to be acquired at test conditions that otherwise would be unattainable, potentially saving several test flights per program. Additionally, and among other benefits, illustrative embodiments of the tunable mass damper described herein allow for the natural vibrational frequencies of the mass damper to be changed remotely without dismantling either the mass damper or the wind tunnel model. No known system or device can perform these functions, particularly with as compact a device as is described herein. Thus, the illustrative embodiments described herein are particularly useful for wind tunnel testing of models with limited internal space. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A tunable mass-damping apparatus, comprising:
a housing having an interior surface, an interior volume containing a fluid, and an axis, the housing configured to be coupled to a wind tunnel model;
a mass configured to move back and forth in the interior volume along the axis, the mass configured to make an airtight seal with the interior surface of the housing, thereby dividing the interior volume into an upper chamber and a lower chamber;
a passage fluidly connecting the upper chamber and the lower chamber; and
a spring configured to exert a position-dependent force upon the mass;
wherein the spring is characterized by a variable spring constant chosen based on a variable natural frequency of a support structure of the wind tunnel model; and
wherein the variable spring constant is established with a nickel-titanium alloy spring ohmically heated to at least one calibrated temperature that corresponds to a predetermined spring constant;
wherein the mass has a weight in a range of 0.5 to 10 percent of the wind tunnel model.

2. The apparatus of claim 1, wherein the interior surface of the housing is cylindrical and the housing includes a mounting base configured to couple the housing to the wind tunnel model.

3. The apparatus of claim 1, wherein the fluid is atmospheric air.

4. The apparatus of claim 1, further comprising a valve configured to control a rate of fluid flow through the passage.

5. The apparatus of claim 1, wherein the spring is an upper spring configured to exert a force upon an upper side of the mass, the apparatus further comprising a lower spring configured to exert a force on a lower side of the mass substantially opposite the upper side, an upper heating element configured to raise the temperature of the upper spring and thereby alter the spring constant of the upper spring and a lower heating element configured to raise the temperature of the lower spring and thereby alter the spring constant of the lower spring.

6. A tunable mass-damping apparatus, comprising:
a housing having an interior surface, an interior volume containing a fluid, and an axis, the housing configured to be coupled to a wind tunnel model;
a mass configured to move back and forth in the interior volume along the axis, the mass configured to make an airtight seal with the interior surface of the housing, thereby dividing the interior volume into an upper chamber and a lower chamber;
a passage fluidly connecting the upper chamber and the lower chamber;
a spring configured to exert a position-dependent force upon the mass, the spring having a temperature-dependent spring constant; and
an ohmic heating assembly configured to raise the temperature of the spring and thereby alter the spring constant of the spring;
wherein the spring is chosen based on a natural vibration frequency of a support structure of the wind tunnel model;
wherein the mass has a weight in a range of 0.5 to 10 percent of the wind tunnel model.

7. The apparatus of claim 6, wherein the temperature-dependent spring constant of the spring is established with a nickel-titanium alloy spring heated to at least one calibrated temperature that corresponds to a predetermined spring constant.

8. The apparatus of claim 6, wherein the spring is an upper spring configured to exert a force upon an upper side of the mass, the apparatus further comprising a lower spring configured to exert a force on a lower side of the mass substantially opposite the upper side.

9. The apparatus of claim 8, wherein the ohmic heating assembly includes (a) an upper heating element configured to raise the temperature of the upper spring and thereby alter the spring constant of the upper spring and (b) a lower heating element configured to raise the temperature of the lower spring and thereby alter the spring constant of the lower spring.

10. The apparatus of claim 8, wherein the ohmic heating assembly includes a voltage source and electrical connections to the upper and lower springs, and wherein the ohmic heating assembly is configured to raise the temperature of the upper spring by passing a first current through the upper spring and to raise the temperature of the lower spring by passing a second current through the lower spring.

11. The apparatus of claim 8, wherein the ohmic heating assembly includes a voltage source, an upper electrode electrically connected to the upper spring, and a lower electrode electrically connected to the lower spring, wherein the mass includes a conductive pathway which is electrically connected to the upper spring and the lower spring, and wherein the ohmic heating assembly is configured to raise the temperature of the upper spring and the temperature of the lower spring by passing current through the upper and lower springs.

12. A method of reducing dynamic forces on a wind tunnel model during wind tunnel testing, comprising:
selecting a mass with weight equal to a predetermined percentage of weight of the wind tunnel model;
selecting a spring with a temperature-dependent, variable spring constant chosen based on a natural frequency of a support structure for the wind tunnel model;

attaching to the wind tunnel model a mass-damping apparatus that includes:
- a housing having an interior surface, an interior volume containing a fluid, and an axis, the housing configured to be coupled to the wind tunnel model;
- the selected mass configured to move back and forth in the interior volume along the axis, the mass configured to make an airtight seal with the interior surface of the housing, thereby dividing the interior volume into an upper chamber and a lower chamber;
- the selected spring configured to exert a position dependent force upon the mass; and
- an electrical heating assembly configured to raise the temperature of the spring;

exerting control over the spring constant of the spring via the electrical heating assembly; and performing wind tunnel testing on the model;

wherein the mass is selected to have a weight in a range of 0.5 to 10 percent of the weight of the wind tunnel model.

13. The method of claim 12, further comprising changing the spring constant of the spring from a first predetermined spring constant to a second predetermined spring constant by changing a temperature of the spring from a first calibrated temperature to a second calibrated temperature.

14. The method of claim 12, wherein the electrical heating assembly includes an ohmic heating device and wherein exerting control over the spring constant of the spring via the electrical heating assembly includes causing current to flow through the ohmic heating device.

15. The method of claim 12, wherein the electrical heating assembly includes a voltage source and electrical connections and exerting control over the spring constant of the spring via the electrical heating assembly includes causing current to flow through the spring.

16. The method of claim 12, wherein selecting a spring includes selecting a spring chosen to damp a band of frequencies centered on the natural frequency of the support structure.

17. The method of claim 12, wherein selecting a spring includes selecting two springs which collectively have an effective spring constant chosen to reduce motion of the wind tunnel model at the natural frequency of the support structure.

18. The method of claim 17, wherein the electrical heating assembly includes two heating elements, with each heating element associated with each of the two springs.

* * * * *